March 17, 1970  J. B. BECKMAN  3,501,745
FREQUENCY SELECTIVE RESONANT REED DETECTOR
Filed July 15, 1965  2 Sheets-Sheet 1
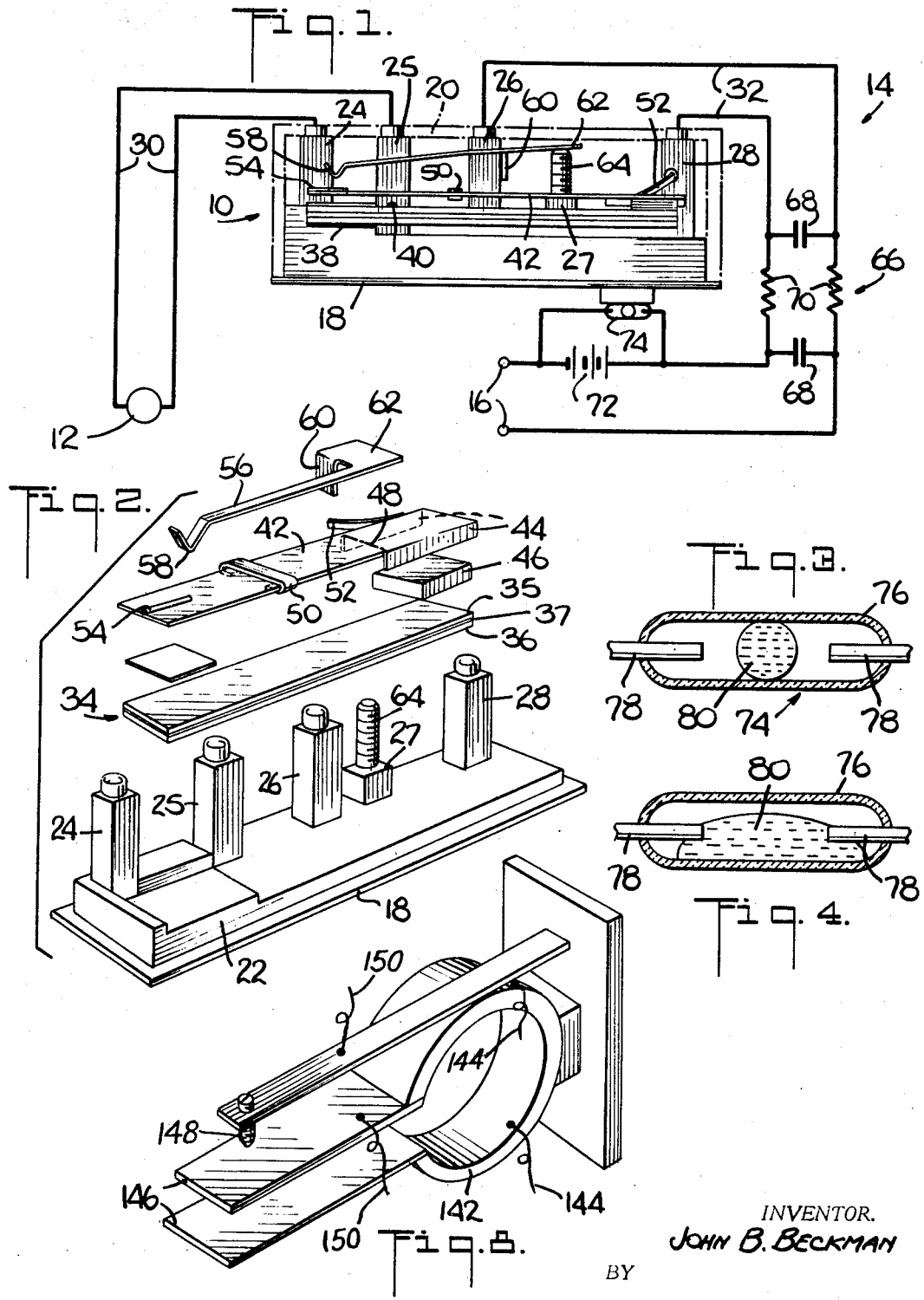

March 17, 1970  J. B. BECKMAN  3,501,745

FREQUENCY SELECTIVE RESONANT REED DETECTOR

Filed July 15, 1965  2 Sheets-Sheet 2

INVENTOR.
JOHN B. BECKMAN
BY
ATTORNEYS

United States Patent Office

3,501,745
Patented Mar. 17, 1970

3,501,745
FREQUENCY SELECTIVE RESONANT REED DETECTOR
John B. Beckman, Northvale, N.J., assignor to Lear Siegler, Inc., Santa Monica, Calif., a corporation of Delaware
Filed July 15, 1965, Ser. No. 472,171
Int. Cl. H04q; H01h *35/02, 35/14*
U.S. Cl. 340—156                                   12 Claims

ABSTRACT OF THE DISCLOSURE

A frequency selective device including a piezoelectric transducer which vibrates one end of a resonant reed is disclosed. Switch contacts including said reed close at resonant vibration amplitude. A shock responsive protective switch is provided.

---

This invention relates to frequency selective devices and more particularly it concerns an improved resonant reed arrangement for signalling the occurrence of electrical signals which vary or occur at a given rate.

The present invention is particularly useful in signal decoders, for example, in the tone detectors of certain radio controlled paging systems. In such systems, radio signals are broadcast from a central transmitter and are modulated with audio frequency tones at anywhere from 50 to 2000 cycles per second. These signals are sent to a plurality of receivers, each of which detects the transmitted signal and applies it to vibrate its own resonant reed arrangement which is set to resonate under forced vibrations of a particular frequency. Thus, when the modulation of the transmitted signal is such as to vibrate a particular receiver's reed arrangement into resonance, this resonance is detected and a recognizable signal is produced indicating that the receiver has been called. Where many receivers are to be incorporated into the paging system, and the number of available tones is limited, each receiver can be provided with a number of variously tuned reed arrangements, the outputs of which are coupled such that a recognizable signal is produced only upon the receipt of a particular sequence of resonance inducing tones.

The present invention, in one of its aspects, is concerned with an improved resonant reed arrangement. This improved arrangement utilizes a piezo-electric transducer which undergoes physical strain wtih changes in applied voltage. The movements of the transducer are imparted to a resonant reed in such a manner as to force the reed to vibrate without affecting its natural frequency.

In prior systems utilizing piezo-electric transducers, a vibratory reed, was cantilevered at one end to a base and the transducer was secured along the reed so that it formed part of the vibratory system. As the transducer expanded and contracted under the influence of applied electrical signals, it would cause bending of the reed in much the same manner as temperature changes cause bending of the bimetallic element in a common thermostat. When this bending reached the resonant frequency of the vibrating system, the free end of the reed would experience an increase in swing amplitude which was detected and sent out as a recognizable signal.

These prior systems, unfortunately, produced a relatively small output amplitude even at resonance. One reason for this was that the reed had to be sufficiently sturdy to support the transducer material. Also, as the amount of bending increased, shear stresses were set up at the interface between the transducer and the reed.

Another difficulty encountered with prior systems occurred as a result of the effect of the transducer itself upon the resonant frequency of the reed. The transducer material would experience damping due to internal friction and hysteresis; and this effectively lowered the sharpness with which the vibratory system could be tuned. Also, the temperature sensitivity of the transducer would produce marked effects upon the resonant frequency of the system.

The above and other difficulties have been overcome by means of the present invention. According to one feature of this invention there is provided a resonant reed arrangement which produces a maximum amplitude output with a minimum of power input. This novel reed arrangement moreover has finely tunable resonant characteristics which do not change with either temperature or repeated use.

According to the present invention these advantages are obtained by means of a novel reed mounting system which itself vibrates. The reed is entirely free except for a single secure connection to the vibratory mounting system. The vibratory system does not bend the reed directly but instead accelerates one portion of the reed against its distributed inertia so that a distributed lag is produced out to the end of the reed. When the frequency of the applied vibrator is such that the lag at the end of the reed causes it to follow the vibratory movement of the mount by 90°, then resonance occurs and energy will flow from the mount into the reed causing the amplitude of movement at the end of the reed to greatly exceed that of the mount.

In the illustrative embodiments, the reed is cantilevered at one end to the transducer in such a manner that the transducer vibrations are applied perpendicularly to the length of the reed. Because the reed does not support the transducer or anything other than its own weight, it can be made very light. This in turn reduces the power needed to drive it and thus enables a given transducer to drive it to greater amplitudes. Conversely, since the transducer is not part of the vibratory system but rather is part of the mounting system it can be made more massive and more powerful.

In certain specific embodiments a pair of reeds are driven in opposition to each other in order to achieve balance and to isolate the transducer mounting from the effects of its vibration.

One of the important features of the present invention lies in its ability to maintain a precise and sharply defined resonant frequency. This has been accomplished through the recognition that there must be maintained an exact fulcrum point from which the beam bends. As described above, this is achieved by cantilevering the reed at the vibratory transducer so that all flexing takes place from a precisely defined point along the reed. In a more specific aspect, the present invention insures the maintenance of this precisely defined point by means of a channelized mounting configuration formed from the reed material itself at its rear portion. The channel sides prevent any flexure up to the point where they terminate so that all flexing of the reed takes place beyond that point. This arrangement makes the point of initial flexure substantially independent of the interconnection between the reed and the transducer; and it prevents movement of this point even after repeated vibration.

Although the present invention makes possible the use of a very lightweight, low inertia reed element, it is possible under certain conditions of shock or externally applied vibration that the reed tip may swing to a position which it would under conditions of resonance. In another of its aspects, the present invention provides a novel shock sensitive switch which can be arranged in conjunction with the reed output circuit for disabling the output during such occurrences. This novel switch comprises a non-conductive outer envelope into the ends of which a pair of contacts extend. A cohesive electrically conductive substance, such as mercury is arranged inside the envelope and under normal non-shock conditions, it assumes a substantially spherical configuration and fails to touch both contacts. When the switch is subjected to shock loads however, the mercury distorts and elongates against the side of the envelope so that it does touch both contacts. The switch is placed in shunt across the power supply for the reed output so that during the occurrence of shock or external vibration it acts to short circuit the output circuit thus preventing a false indication of electrically induced resonance.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a side elevational view and partial schematic of a frequency selective system forming one embodiment of the present invention;

FIG. 2 is an exploded view showing the operative components of the frequency sensitive portion of the system of FIG. 1;

FIGS. 3 and 4 are side elevational views taken in section showing a shock sensitive switch forming a portion of the embodiment of FIG. 1;

FIG. 8 is a perspective view showing a still further form of the invention.

Figure 5:
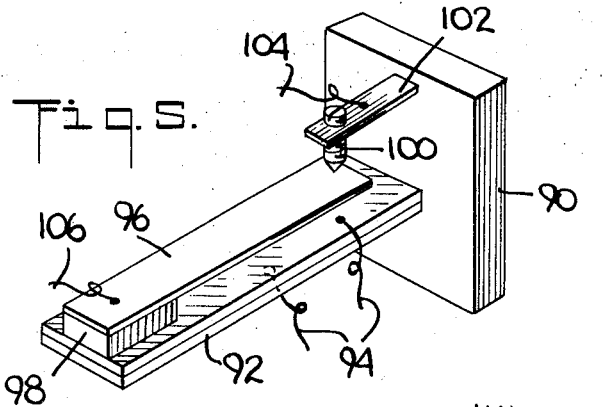
FIG. 5 is a perspective view illustrating a simplified form of the invention.

In the system of FIG. 1, there is provided a resonant reed unit 10 which is tuned to respond to a particular frequency. A signal generator 12 and an output circuit 14 are connected to the unit 10. The signal generator 12 supplies electrical signals which vary at different frequencies in the general range to which the resonant reed unit 10 is tuned, i.e., 50 to 2000 cycles per second. When the applied signals reach the tuned frequency of the unit 10, the unit operates in conjunction with the output circuit 14 to provide an electrical output across a pair of output terminals 16. These output terminals may be connected to any utilization means (not shown) such as an audio alarm or a visual indicator.

The resonant reed unit 10 includes a base member 18 and a cover 20, both of plastic or similar non-conductive material. As shown in FIG. 1, the base and cover combine to form a housing for the various internal components of the unit.

The internal configuration of the resonant reed unit 10 is best seen in the exploded view of FIG. 2. As shown in this figure, the base member 18 is of generally rectangular configuration and is formed with a step 22 toward one end. Five electrically conductive posts 24–28 protrude upwardly from one side of the base member 18. The first two posts, 24 and 25, form electrical input terminals; and as shown in FIG. 1, they extend up through the top of the cover 20 and receive a pair of input wires 30 which connect them to the input signal generator 12. The third and fifth posts 26 and 28 also extend up through the top of the cover 20 and form electrical output terminals. These last mentioned posts also receive output wires 32 which connect the posts across the output circuit 14. The fourth post 27, is shorter than the others, and is threaded to receive an adjustment screw 64, the operation of which will be described below.

An elongated piezo-electric transducer 34, of bimorph or lamina construction, is attached at one end to the step 22; and extends in cantilever fashion out over the base member 18. The transducer 34 is made up of upper and lower ferro-electric layers 35 and 36, between which is sandwiched a thin metal shim member 37 of brass or similar material. The ferro-electric layers 35 and 36 are of a ceramic poly-crystalline material such as barium titanate; and they are polarized such that when positive voltage is applied to one of them and negative voltage to the other, the one layer will expand while the other contracts. This produces a bending action in the plane of the transducer in much the same manner as the unequal expansion of the reed elements in a common thermostat. The transducer 34 is affixed to the step 22 by means of an electrically conductive epoxy cement or solder 38 which serves to establish electrical connection between the lower ferro-electric layer 36 and the conductive post 24. In order to prevent the lower ferro-electric layer 36 from contacting the second input post 25, the transducer in this region is coated with a non-conductive paint or similar insulative material. There is provided however, a conductive connection 40 between the second input post 25 and the upper ferro-electric layer 35. Thus when signals from the generator 12 are applied across the input post 24 and 25, these signals will be applied across the upper and lower ferro-electric layers 35 and 36 respectively.

It will be appreciated that when alternating voltages are applied to the input posts 24 and 25, the right end of the transducer will vibrate up and down at the frequency of these signals.

A resonant reed member 42 is mounted, also in cantilever style on the right-hand or free end of the transducer 34. This resonant reed member is made of thin, tempered steel strip and has a high degree of resiliency which gives it a sharp vibration resonance characteristic. The right or mounting end of the resonant reed member 42 is formed with bent down flanged sides 44. The reed member 42 is mounted to the transducer 34 by means of a mounting block 46 of epoxy or similar material which provides a secure cantilever type mounting while maintaining the resonant reed member 42 electrically isolated from the transducer 34, and while supporting the reed member sufficiently above the transducer to allow its free end to bend up and down without interference by the transducer.

The resonant reed member 42 is free to flex in its own plane at a certain natural frequency determined by its length, its elastic modulus and its cross-sectional area. The actual bending length of the reed member 42 is measured from its free end to a line of flexure 48 which extends between the flange sides 44. It will be appreciated that because of the flanged sides 44, no part of the resonant reed member 42 in the vicinity of the mounting block 46 can flex or bend, all flexing or bending being confined by the sides 44 to the area beyond the line of flexure 48 to the free end of the reed member 42. Thus, by virtue of the flanged sides 44 there is maintained a definite length of flexibility and thus a precise frequency characteristic which will not change due to usage or temperature variations.

There is additionally provided a tuning band 50 of spring steel or similar material which grips the resonant reed member 42 and is slidable therealong for adjusting its natural frequency. The resonant reed member 42 is additionally provided with two electrical contact elements including a side strip 52 which extends laterally from one of the flanged sides 44 and a gold plated contact wire 54 which extends for a short distance along the upper surface of the reed member 42 near its free end.

An adjustable contact 56, formed of steel strip, is mounted to extend along and immediately above the resonant reed member 42. The adjustable contact 56 has a forward portion bent down and back to form a contact point 58 which touches the contact wire 54 of the resonant reed member 42 when the tip of the resonant reed member vibrates at a given amplitude. The adjustable contact 56 is formed with a mounting flange 60 which is soldered or similarly fastened to the third conductive post 26 as shown in FIG. 1. An adjusting flange 62 extends out behind the mounting flange 60 in the plane of the forward portion of the adjustable contact. This adjusting flange extends over the fourth post 27 and intercepts the line of movement of the adjustment screw 64. By turning the adjustment screw 64 up against the adjustment flange 62, the tilt of the contact 56 may be adjusted to move the contact point 58 toward or away from the contact wire 54 of the resonant reed member 42.

The output circuit 14 includes a filter system 66 comprising capacitors 68 and resistors 70 for maintaining a continuous current flow even though only momentary contact is made by the resonant reed member 42. The output circuit 14 further includes a battery 72 connected along one of the output wires 32 leading to the output terminals 16.

There is additionally provided a shock sensitive switch 74 which is connected in shunt across the battery 72. The shock sensitive switch 74 is normally opened; but it is operative to close and short circuit the battery under conditions of excessive externally applied shock or vibration. The switch 74 is thus effective to prevent false outputs from occurring when sudden externally applied shock or vibration causes the resonant reed member 42 to be thrown against the adjustable contact 56.

The construction of the shock sensitive switch 74 is shown in FIGS. 3 and 4. As shown in FIG. 3, the switch consists of a generally cylindrically shaped glass envelope 76 mounted in fixed relation to the base 18 of the resonant reed unit 10. A pair of terminal contacts 78 protrude into the envelope from opposite ends respectively. These terminal contacts are connected to one of the output wires 32 across the battery 72. A bead or drop 80 of cohesive or elastic electrically conductive material such as mercury is enclosed within the envelope 76. Under normal conditions, as shown in FIG. 3, the drop 80 fails to make contact simultaneously with both of the electrodes or contacts 78. However, under conditions of shock or vibration, the drop will be forced against the sides of the envelope 76 and will thus spread out slightly to assume the configuration as shown in FIG. 4. In this configuration, the drop touches both terminal contacts simultaneously and shunts the battery 72 thus effectively disconnecting the battery from the output terminals 16.

In operation of the overall system, signals from the input signal generator 12 are applied across the ferroelectric layers 35 and 36 of the transducer 34 causing it to bend up and down as aforedescribed. The up and down movement of the free end of the transducer 34 is communicated directly to the mounting end of the resonant reed member 42 and this movement in turn results in a flexing or bending of the resonant reed member beyond the line of flexure 48. When the frequency of transducer bending equals the natural bending frequency of the resonant reed member 42, the free end of the resonant reed member will undergo a sharp increase in amplitude of movement thus bringing the contact wire 54 up into actual touching contact with the contact point 58 of the adjustable contact member 56. This closes the circuit between the output wires 32 and places the battery 72 into circuit with the utilization means connected to the output terminal 16.

It will be noted that the transducer 34 does not produce any direct bending of the resonant reed member 42 and forms no part of the frequency determining vibratory system. Instead, the vibratory system is confined to the region between the line of flexure 48 and the tip or free end of the resonant reed member 42. As a result of this, the reed may be made extremely light while the transducer can be substantially massive. This, in turn, permits of maximum output amplitude with a minimum of input power.

FIG. 5 shows a more fundamental construction of the resonant reed switching arrangement. This construction comprises a solid base element 90 from which a transducer element 92 extends in cantilever fashion. The transducer element is of bimorph or laminar construction; and may comprise a single ferro-electric layer in conjunction with a non-ferro-electric layer; or it may comprise a pair of oppositely polarized ferro-electric layers. In either event, a pair of input leads are connected to supply voltage at proper points on the transducer so as to cause uneven expansion and/or contraction and consequent bending in a vibratory manner. A resonat reed element 96 is attached by means of a mounting block 98 to the free end of the transducer element 92 and is physically moved up and down by the vibratory movement of the transducer element. An adjustable contact 100 extends out over the free end of the resonant reed 96 and is attached by means of a mounting element 102 to the base 90. Output wires 104 and 106 are connected respectively to the adjustable contact 100 and to the non-flexing end of the resonant reed 96. When the voltage applied through the input wires 94 cause the free end of the transducer 92 to vibrate at the natural resonant frequency of the reed 96, the reed will be induced to resonate so that its free end will undergo a sharp change in amplitude vibration thus contacting the adjustable contact 100 and establishing a closed circuit between the output wires 104 and 106.

Figure 6:
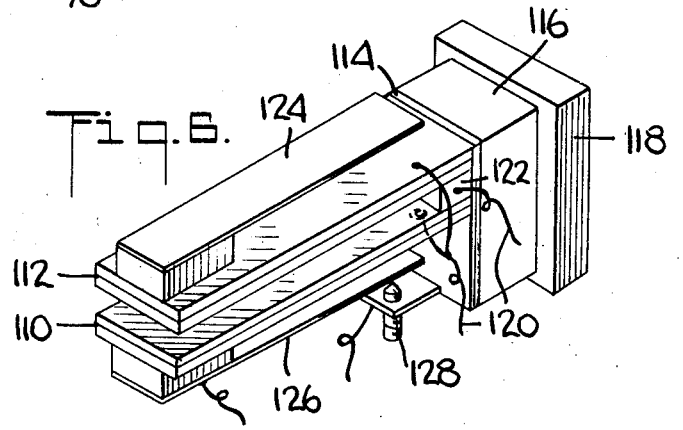
FIG. 6 is a perspective view showing a further modified form of the invention.

FIG. 6 shows a further form of the invention wherein there are provided a pair of transducer element 110 and 112, each of which extends in cantilever fashion from a mounting plate 114. The mounting plate 114 in turn is attached through a compliant mount 116 to a base 118. Alternating electrical signals are applied in phase opposed relationship to each of the transducers 110 and 112 through a pair of input wires 120. One of the input wires is connected through a block 122 to the inner facing surfaces of the tranducers 110 and 112; and the other wire is connected to the outer surfaces of these tranducer elements. A pair of resonant reed elements 124 and 126 are mounted in cantilever fashion and the free ends of the transducer elements 110 and 112 as shown in FIG. 6. An adjustable contact 128 is provided near the free end of the lower resonant reed 126 and a pair of output wires are connected respectively to the mounting end of the lower and to the adjustable contact 128. The apparatus in the embodiment of FIG. 6 operates in a manner similar to that of FIG. 5. However the provision of the upper transducer 112 and the upper reed 124 which are driven in phase opposed relationship to the lower transducer 112 and reed 126, operate to cause a force balance to prevent the driving energy applied to the transducer elements from being absorbed by the base member 118. Also, this arrangement makes the device less sensitive to externally applied shock or vibration. This is because under such conditions both transducer elements would move in phase with each other whereas when voltages are applied via the input wires, these voltages produce phase opposed vibrations. Thus the back voltages generated by the two synchronously bending transistors are phase opposed and cancel each other before being tarnsmitted back along these wires.

Figure 7:
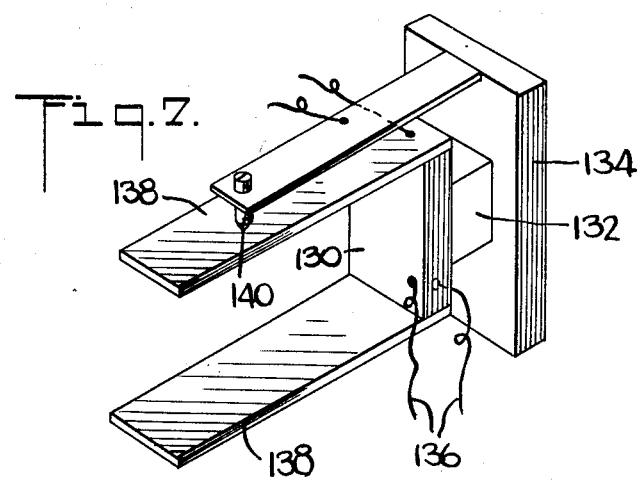
FIG. 7 is a perspective view showing another form of the invention.

The embodiment shown in FIG. 7 shows a single element transducer 130 mounted by means of a resilient mounting block 132 to a solid base member 134. This single element transducer elongates and contracts in opposite directions when alternating voltages are applied across a pair of input wires 136. A pair of resonant reed elements 138 are mounted in cantilever fashion to extend from the opposite ends of the transducer 130. These reed elements are thus driven in phase opposed relationship and develop and maintain a force balanced relationship which serves to direct transducer vibrational energy entirely into the reed elements for maximum output. As in the previously described embodiments, the embodiment of FIG. 7 is provided with the resonance detecting means comprising an adjustable contact 140 and a pair of output wires connected respectively to the adjustable contact and to the associated reed element 138.

FIG. 8 shows an embodiment similar to that of FIG. 7 but utilizing an elongated single element transducer 142 bent into nearly circular form. Input leads 144 are connected to induce longitudinal expansion and contraction of the transducer upon application of alternating voltages through the leads. Also a pair of resonant reed elements 146 are mounted on the ends of the transducer 142 and extend therefrom in cantilever fashion and parallel to each other so that the same force balance relationship and efficient utilization of transducer energy is achieved in this embodiment as is achieved in the above described embodiment. An output circuit comprising an adjustable contact 148 and a pair of output leads 150 may also be provided.

What is claimed as new and desired to be secured by Letters Patent is:

1. A frequency selective resonant reed switch apparatus comprising a solid base member, a vibrator comprising a multi-layered flat elongated element mounted at one end to said base thereby to extend in cantilever fashion from said base member, said vibrator including a ferroelectric material capable of producing bending along its length in response to applied voltages, said vibrator having a raised step on its free end, a resonant reed element mounted at one end on said raised step of said vibrator and extending back in cantilever fashion along and above the vibrator and otherwise free to move with respect to said vibrator and said base member, a contact element mounted and positioned in the path of vibratory movement of the free end of said resonant reed element, an input circuit comprising a pair of input terminals electrically connected to said ferroelectric material for applying varying electrical voltages thereto for producing bending and vibration along the length of said vibrator, and a pair of output terminals adapted to be connected to a signal means responsive to closing of said reed switch, means electrically connecting one of said output terminals to said resonant reed element and means electrically connecting the other output terminal to said contact whereby said reed element and said contact element act as a single pole single throw switch in series between said output terminals.

2. The apparatus of claim 1 wherein said input terminals are carried by said base member.

3. The appartus of claim 1 wherein said electrical connecting means includes a pair of posts supported at one end by said base member, and a switch terminal carried at the other end of said posts.

4. The apparatus of claim 1 wherein there is provided a shock responsive switch mounted on said base member, said shock responsive switch being connected to render electrically ineffective the closing of said resonant reed element and said contact element upon the occurrence of any external shock which otherwise would produce false indication of resonance of said resonant reed element.

5. The apparatus of claim 1 wherein there is provided a shock responsive switch including a hollow non-electrically conductive envelope, a pair of spaced electrode elements extending within said envelope, an electrically conductive elastic substance carried within said envelope and normally out of bridging contact with both of said electrode elements, said elastic substance being capable of deforming under shock conditions to bridge the gap between said electrode elements thereby to close said shock switch, and electrical means connecting said electrode elements in circuit with said resonant reed element and said contact element to render electrically ineffective the closing of same upon conditions of externally applied shock.

6. The apparatus of claim 5 wherein said elastic substance is mercury.

7. The apparatus of claim 1 wherein there are provided adjustable means for adjusting the position of said contact element to vary the spatial distance between said free end of said resonant reed element and said contact element.

8. The apparatus of claim 1 wherein said one end of said resonant reed element includes opposed bent-down flanged sides, said flanged sides mounting said resonant reed element to said step and extending equally at least the length of said step toward said free end, the end of said flanged sides toward said free end defining an imaginary stationary line across said resonant reed element, thereby confining all vibration of said resonant reed element to that portion of the length thereof between said line and said free end whereby a substantially constant resonant frequency characteristic may be maintained.

9. The apparatus of claim 1 wherein there is provided a tuning band slideably mounted on said resonant reed element for adjusting its resonant frequency.

10. The apparatus of claim 1 wherein said cantilevered vibrator member extends generally parallel to said base member.

11. The apparatus of claim 1 wherein there is provided a second vibrator including a further multi-layered flat elongated element mounted at one end on said base member thereby to extend in cantilever fashion from said base member, said second vibrator being in generally parallel and spaced relation to the first vibrator, said second vibrator including a ferroelectric material capable of producing bending along its length in response to applied varying input voltages, and means for applying said varying input voltages to both of said vibrators for producing bending and vibration in phase opposed relation along the lengths of said vibrators.

12. The apparatus of claim 11 comprising a second resonant reed element, a raised step on the free end of said second vibrator, said second resonant reed element being mounted at an end by said last raised step to extend back in cantilever fashion along and above the second vibrator and otherwise free to move with respect to said second vibrator and said base member.

References Cited

UNITED STATES PATENTS

| 1,872,257 | 8/1932 | Durkee | 340—156 |
| 2,845,607 | 7/1958 | Bowler et al. | 348—171 X |
| 2,861,256 | 11/1958 | Hart | 340—156 X |
| 2,122,921 | 7/1938 | Sands | 200—61.47 |
| 2,161,411 | 6/1939 | Erich | 200—61.47 |
| 2,195,417 | 4/1940 | Mason | 317—144 |
| 2,983,902 | 5/1961 | Philipps | 340—156 |
| 3,109,165 | 10/1963 | Bagno | 340—258 |
| 3,232,119 | 2/1966 | Salerno | 200—61.47 X |

HAROLD I. PITTS, Primary Examiner

U.S. Cl. X.R

200—61.47; 310—8; 317—87, 144